(12) United States Patent
Parizat et al.

(10) Patent No.: US 6,871,871 B2
(45) Date of Patent: Mar. 29, 2005

(54) AIR BAG INFLATOR

(75) Inventors: Amnon Parizat, Old Westbury, NY (US); Marek Tarczynski, New York, NY (US)

(73) Assignee: Island Pyrochemical Industries Corp., Mineola, NY (US)

( * ) Notice: Subject to any disclaimer, the term of this patent is extended or adjusted under 35 U.S.C. 154(b) by 98 days.

(21) Appl. No.: 10/243,154

(22) Filed: Sep. 13, 2002

(65) Prior Publication Data
US 2004/0051283 A1 Mar. 18, 2004

(51) Int. Cl.[7] .............................................. B60R 21/26
(52) U.S. Cl. ...................................................... 280/736
(58) Field of Search ................................ 280/736, 737, 280/740, 741

(56) References Cited
U.S. PATENT DOCUMENTS 3,889,703 A    6/1975  Keathley
5,487,561 A  * 1/1996  Mandzy et al. ............. 280/741
5,829,784 A  * 11/1998 Brown et al. ................ 280/737
6,036,226 A    3/2000  Brown et al.
6,039,347 A    3/2000  Maynard

* cited by examiner

Primary Examiner—Faye M. Fleming
(74) Attorney, Agent, or Firm—Francis C. Hand; Carella, Byrne, Bain et al.

(57) ABSTRACT

The air bag inflator is particularly useful for mounting in a steering wheel of a vehicle for inflating an air bag. A magnetic control unit is disposed concentrically of an injection piston through which liquid propellant is injected from a liquid propellant chamber into a combustion chamber. In one embodiment, the injection piston and pump piston are contoured to define a contoured liquid propellant chamber. In a second embodiment, an annular injection piston is slidably mounted on an annular pump piston to define an annular liquid propellant chamber.

23 Claims, 2 Drawing Sheets

AIR BAG INFLATOR

Figure 1:
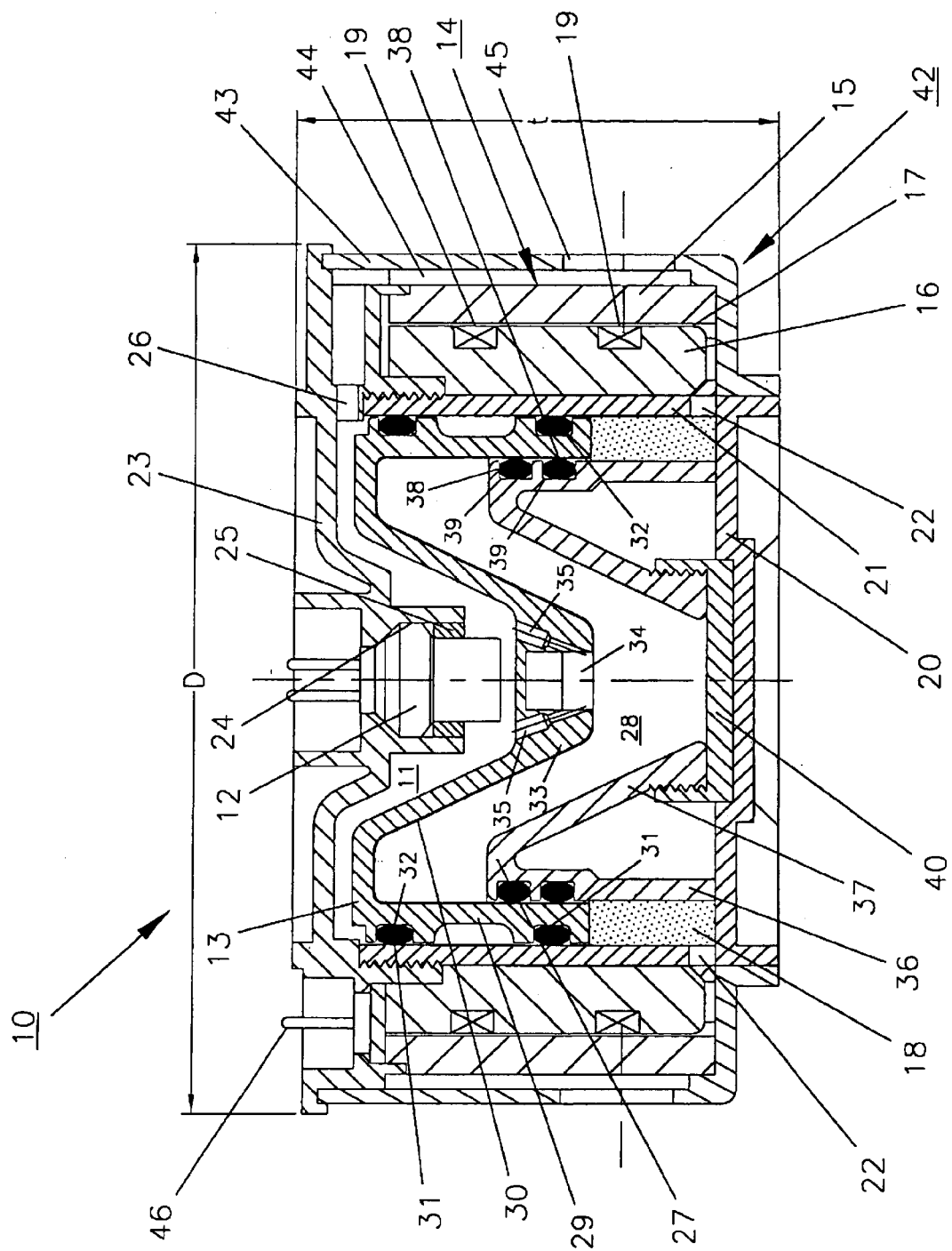

This invention relates to an air bag inflator. More particularly, this invention relates to an air bag inflator for mounting in a steering wheel of a vehicle.

As is known various types of air bags and inflators for inflating the air bags have been employed in vehicles to protect an occupant against possible injury in the event of a crash of the vehicle against another object.

U.S. Pat. No. 6,036,226 describes an air bag inflator in which a liquid propellant is introduced into a combustion chamber at a controlled rate via a central opening in a piston in order to inflate an air bag. As described, use is made of a damping chamber filled with a magneto-rheological fluid that is pumped through an orifice during a regenerative pumping stroke of the piston to control the air bag inflation rate. To this end, an electromagnet is energized to produce a varying magnetic field to affect the rheological properties of the magneto-rheological fluid flowing through the orifice and thus vary a damping force exerted on the piston stroke.

U.S. Pat. No. 5,669,631 describes an air bag inflator of a liquid propellant type in which a liquid propellant is introduced into a combustion chamber at a controlled rate in order to inflate one or more air bags. As described, the liquid propellant is passed from a reservoir into the combustion chamber by passing around an annular head of the piston through grooves in the wall of the cylinder housing the piston. U.S. Pat. No. 5,060,973 describes a further technique for inflating an air bag.

As is known, air bags have been mounted in the steering wheels of vehicles in order to be deployed in response to various events such as an impact crash. Because of the limited space available in a steering wheel, the air bag and the inflator for the air bag must be made with a compact construction.

It is an object of this invention to provide air bag inflator which has a relatively large diameter and relatively small thickness, that is to say, an inflator of flat construction.

It is another object of the invention to provide an air bag inflator that operates with a variable output.

Briefly, the invention provides and air bag inflator of flat construction having a larger diameter than thickness thereof.

The air bag inflator is constructed to have a means defining a combustion chamber, an initiator for introducing a combustion gas into the combustion chamber, an injection piston that is slidably mounted in the combustion chamber and a magnetic control unit concentric to the injection piston for controlling movement of the injection piston from an initial position towards a second position in response to the introduction of a hot combustion gas into the combustion chamber from the initiator.

The injection piston is constructed with a propellant chamber for containing a charge of liquid propellant, at least one nozzle communicating the propellant chamber with the combustion chamber and means for releasably closing the nozzle to prevent communication between the propellant chamber and the combustion chamber.

In one embodiment, the means defining the combustion chamber is a cup-shaped body having an annular wall to define the combustion chamber. In addition, a pump piston is coaxially mounted in the body and the injection piston is slideably mounted in the annular wall of the cup-shaped body and slideably mounted on the pump piston to define the propellant chamber therebetween.

In this embodiment, the magnetic control unit includes a sleeve disposed concentrically of the annular wall of the body, a core disposed in and concentrically spaced from the sleeve to define a gap therebetween and a reservoir for magneto-rheological fluid (hereinafter "MR fluid") between the injection piston and the gap in order to deliver fluid into the gap in response to the injection piston moving from the initial position towards the second position on the pump piston. In addition, at least one electromagnetic coil is provided for producing an electromagnetic field across the gap in order to affect the rheological properties of the MR fluid in the gap whereby an increase in the electromagnetic field effects an increase in the flow resistance of the MR fluid in the gap.

A contoured plate is also secured to the annular wall of the cup-shaped body at one end to provide a closure for the combustion chamber. Further, the plate is provided with at least one exhaust port for expelling combustion gases from the combustion chamber. In addition, a diffuser is provided in communication with the exhaust port This diffuser has an annular wall concentric to and spaced from the sleeve of the magnetic control unit to define a diffuser chamber therewith for receiving the combustion gases. Further, the diffuser wall has at least one outlet for expelling the combustion gases therefrom.

The contoured plate is also spaced from the sleeve and core of the magnetic control unit to define a chamber in communication with the gap between the sleeve and core in order to receive MR fluid therefrom.

In operation, when a suitable signal is received, for example from a central processing unit indicative of a need to imploy an air bag from a vehicle steering wheel, the initiator delivers a charge of hot combustion gas into the combustion chamber of the inflator. As the hot gas expands, the injection piston moves on the pump piston to compress the propellant in the propellant chamber to a pressure sufficient to inject the liquid propellant through the nozzle into the combustion chamber for combustion therein. During this time, the means for releasably closing the nozzle is opened to the passage of liquid propellant. As the injection piston continues to move, additional liquid propellant is injected into the combustion chamber and combusted therein.

During the time that the piston slides on the pump piston, the MR fluid in the reservoir is forced out of the reservoir and into the gap between the sleeve and core of the magnetic control unit. Depending upon a signal delivered by the central processing unit to the electromagnetic coil, the yield stress of the MR fluid in the gap is varied. The MR fluid passing through the gap is then collected in the chamber between the magnetic control unit and the contoured plate at the end of the inflator.

The manner of controlling the combustion process is the same as described in co-pending Patent Application entitled Variable Output Inflator and filed on even date In another embodiment, the inflator includes means defining a first combustion chamber, an initiator for introducing a combustion gas into the first combustion chamber and a housing having an annular wall defining an annular combustion chamber about and in communication with the first combustion chamber in order to receive hot combustion gases therefrom.

In this embodiment, an annular pump piston is mounted in the annular combustion chamber and an annular injection piston is slidably mounted on the pump piston to define an annular liquid propellant chamber therebetween. This injection piston is slidably mounted in the annular wall of the housing and is slidably mounted on the means that defines the first combustion chamber. This injection piston also has at least one nozzle communicating the propellant chamber with the annular combustion chamber to deliver liquid propellant thereto and means for releasably closing the nozzle to prevent communication between the propellant chamber and the annular combustion chamber.

A magnetic control unit is also provided for controlling movement of the injection piston relative to the pump piston. This magnetic control unit includes a sleeve disposed concentrically on the wall of the housing, a core disposed in and concentrically spaced from the sleeve to define a gap therebetween, a reservoir for MR fluid between the annular injection piston and the gap and at least one electromagnetic coil for producing an electromagnetic field across the gap.

An annular plate is also secured between the means defining the first combustion chamber and the housing in order to close the annular combustion chamber. This plate has at least one exhaust port communicating with the annular combustion chamber in order to exhaust combustion gases therefrom.

In this embodiment, the means defining the first combustion chamber includes a first tubular member disposed concentrically within the annular injection piston and a second tubular member disposed concentrically of the injection piston and coaxially of the first tubular member. Both of these tubular members are secured in threaded relation to each other and extend toward each other from opposite sides of the inflator.

The initiator is mounted between the two tubular members being seated in the second tubular member and held in place by the first tubular member. The first tubular member also has a plurality of radially disposed openings that communicate the first combustion chamber with the annular combustion chamber.

The operation of the second embodiment of the inflator is similar to the first embodiment. That is to say, the initiator is activated to deliver a charge of hot gas into the first combustion chamber and, thence, through the openings thereof into the annular combustion chamber. As the hot combustion gases expand, the annular piston is pushed over the pump piston thereby compressing the liquid propellant in the liquid propellant chamber. At the same time, MR fluid is forced into the gap between the sleeve and core of the magnetic control unit.

In this embodiment, an annular member of cup-shape is disposed concentrically about the sleeve and core of the magnetic control unit to define an accumulator chamber in communication with the gap between the sleeve and core in order to receive the MR fluid therefrom.

These and other objects and advantages of the invention will become more apparent from the following detailed description taken in conjunction with the accompanying drawings wherein.

Figure 2:
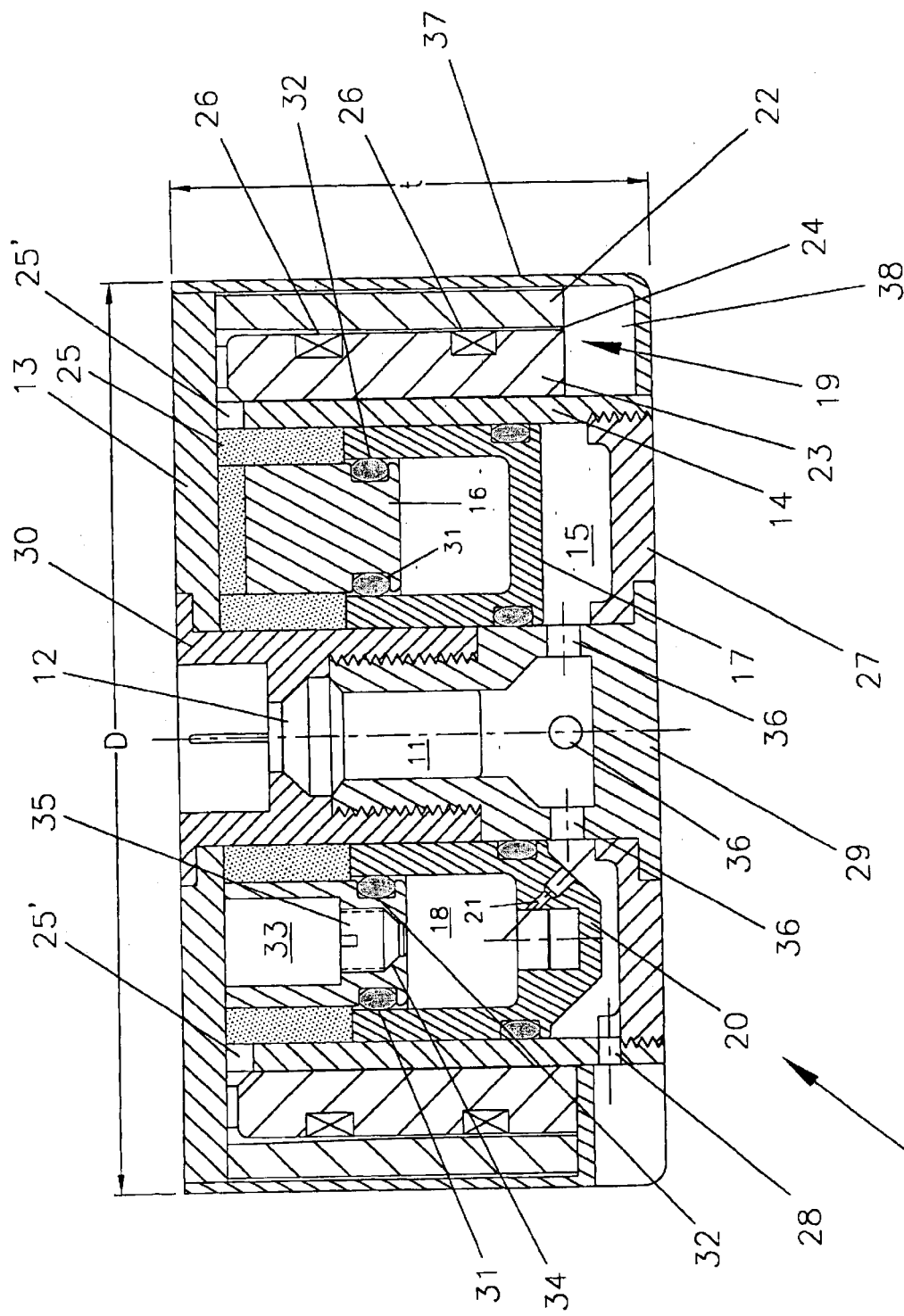

FIG. 1 illustrates a cross-sectional view of an air bag inflator constructed in accordance with the invention; and FIG. 2 illustrates a cross-sectional view of another air bag inflator constructed in accordance with the invention.

Referring to FIG. 1, the air bag inflator 10 is constructed to operate in a manner as described in the above referenced co-pending patent application Ser. No. 10/243,206, filed Sep. 13, 2002 and the disclosure thereof is incorporated herein.

The air bag inflator 10 is particularly constructed for use in a vehicle steering wheel or steering wheel assembly (not shown). To this end, the air bag inflator 10 is of compact construction having a larger diameter D than thickness t. For example, the diameter D of the inflator may be 85 millimeters while the overall thickness t is 47 millimeters.

The air bag inflator 10 has means defining a combustion chamber 11, an initiator 12 for introducing a hot combustion gas into the combustion chamber 11, an injection piston 13 slidably mounted in the combustion chamber 11 and a magnetic control unit 14 for controlling movement of the injection piston 13 from an initial position towards a second position in response to the introduction of a combustion gas into the combustion chamber 11 from the initiator 12.

In accordance with the invention, the magnetic control unit 14 is disposed concentrically of the injection piston 13 in order to allow for a reduction in the overall length or thickness of the inflator 10. In this respect, the magnetic control unit 14 includes a sleeve 15 disposed concentrically of the injection piston 13, a core 16 disposed in and concentrically spaced from the sleeve 15 to define a gap 17 therebetween, a reservoir 18 for MR fluid between the injection piston 13 and the gap 17 that communicates with the gap to deliver fluid thereto in response to the injection piston 13 moving from an initial position towards the second position and a pair of longitudinally spaced apart electromagnetic coils 19 for producing an electromagnetic field across the gap 17 to affect the rheological properties of the MR fluid in the gap 17 whereby an increase in the electromagnetic field effects an increase in the flow resistance of the MR fluid in the gap 17.

The means defining the combustion chamber 11 includes a cup-shaped body 20 having an annular wall 21. As illustrated, the annular wall 21 slidably receives the injection piston 13 and also slidably receives the core 16 on an opposite side. The annular wall 21 also has a plurality of openings 22 communicating the MR fluid reservoir 18 with the gap 17 between the sleeve 15 and core 16 of the magnetic control unit 14.

The means defining the combustion chamber 11 also includes a contoured closure plate 23 secured by threading to the annular wall 21 at one end. This contoured plate 23 is provided with a centrally disposed recess 24 into which the initiator 12 is mounted and held in place by a securing ring 25. In addition, the contoured plate 23 has at least one radially disposed exhaust port 26 for expelling combustion gases therefrom.

In addition to being threaded onto the annular wall 21 of the cup-shaped body 20, the plate 23 has a recess to receive the sleeve 15 and core 16 of the magnetic control unit 14 in a slide-fit manner.

A pump piston 27 is slidably mounted in the injection piston 13 to define a liquid propellant chamber 28 therebetween. Together, the injection piston 13 and pump piston 27 form an injection piston assembly that can be slidably mounted in the cup-shaped body 20.

The injection piston 13 has an annular wall 29 and a recessed face 30 within the plane of the wall 29. The wall 29 includes a pair of longitudinally spaced apart annular grooves 31, each of which receives a sealing ring 32, such as an O-ring.

The recessed face 30 of the piston 13 has an inwardly directed nose 33 provided with a centrally disposed recess 34. In addition, a plurality of nozzles 35 are disposed in the nose 33 to communicate the recess 34 with the combustion chamber 11. Means (not shown) for releasably closing the nozzles 35 to prevent communication between the recess 34 and the combustion chamber 11 are also provided. These means are further described in copending patent application Ser. No. 10/243,926, filed Sep. 13, 2002 and need not be further described. Typically, a plug is fitted into the entrance to the recess 34 and a plug is fitted into each nozzle 35 while a tape is disposed over the exit of the nozzle.

The pump piston 27 is of similar contour to the injection piston 13. In this respect, the pump piston 27 has an annular wall 36 and a recessed face 37 disposed within the plane of the wall 36. In addition, the wall 36 has a pair of closely spaced exterior annular grooves 38, each of which receives a sealing ring 39, such as an O-ring, for sealing against the interior of the wall 29 of the injection piston 13.

The pump piston 27 has a centrally disposed opening in the face 37 that is closed over by a cup-shaped plug 40 that is threaded onto the outside of the face 37. As indicated, the plug 40 is centered within a recess 41 in the cup-shaped body 20. This plug 40 allows access to the propellant chamber 28 so that liquid propellant may be introduced into the chamber 28 when the plug is 40 removed.

Once liquid propellant has been introduced into the propellant chamber 28, the plug 40 is threaded onto the pump piston 37 to close off the propellant chamber 28. Thereafter, the resulting injection piston assembly may be slid into the cup-shaped body 20.

A cup-shaped diffuser 42 is mounted on the cup-shaped body 20 and has an annular wall 43 disposed concentrically of and spaced from the annular wall 21 of the cup-shaped body to house the magnetic control unit therein. In addition, the diffuser 43 wall is fitted into the contoured closure plate 23 in a slide-fit manner to define a diffusion chamber 44 that communicates with the exhaust ports 26 in the contoured plate 23 to receive combustion gases therefrom. As indicated, the diffusion chamber 44 is of annular shape and is disposed between the diffuser wall 43 and the sleeve 15 of the magnetic control unit 14. A plurality of outlets 45 are also provided in the wall 43 for expelling combustion gases therefrom.

A suitable electrical line 46 is connected to the contoured closure plate 23 in order to deliver control signals to the electromagnetic coils 19.

The inflator 10 is of flat compact construction and functions in a manner as described in the above referenced co-pending patent application Ser. No. 10/243,206, filed Sep. 13, 2002.

Upon activation of the initiator 12, hot combustion gas is delivered into the combustion chamber 11 to push the injection piston 13 towards the pump piston 27. The injection piston 13, in turn, compresses the liquid propellant in the propellant chamber 28 while pushing MR fluid from the reservoir 18 into the gap 17 between the sleeve 15 and core 16 of the magnetic control unit 14. Shortly thereafter, the means releasably closing the nozzles 35 are compromised so that liquid propellant is injected through the nozzles 35 into the combustion chamber 11 and combusted therein. Signals delivered to the electromagnetic coils 19 control the movement of the injection piston 13 thereby controlling the amount of liquid propellant introduced into the combustion chamber 11. Exhaust gases are expelled from the combustion chamber 11 through the exhaust ports 26 and into the diffuser chamber 44 and then through the outlets 45 of the diffuser 42.

Referring to FIG. 2, wherein like reference numerals indicate like parts as above, the inflator 50 is also of flat construction with a larger diameter D than thickness t.

The inflator 50 includes a means defining a first combustion chamber 11, an initiator 12 for introducing a combustion gas into the first combustion chamber 11, a housing 13 having an annular wall 14 defining an annular combustion chamber 15 about and in communication with the first combustion chamber 11 to receive hot combustion gases therefrom and an annular pump piston 16 mounted in the annular combustion chamber 15.

In addition, the inflator 50 has an annular injection piston 17 slideably mounted on the pump piston 16 to define an annular liquid propellant chamber 18 therebetween and a magnetic control unit 19 concentric to the injection piston 17 for controlling movement of the injection piston 17 relative to the pump piston 16.

The injection piston 17 is slidably mounted in the annular wall 14 of the housing 13 and slidably mounted on the means defining the first combustion chamber 11. The injection piston 17 is constructed with an annular head facing the combustion chamber 15 and on which there are a plurality of raised portions 20. Each raised portion 20 is conically shaped and contains a nozzle 21 for injecting liquid propellant into the combustion chamber as well as means (not shown) for releasably closing the nozzles 21 to prevent communication between the propellant chamber 18 and the annular combustion chamber 15. These raised portions 20 are symmetrically spaced over the head of the injection piston 17.

The injection piston 17 is otherwise constructed such as described in the above referenced co-pending patent application Ser. No. 10/243,206, filed Sep. 13, 2002.

The magnetic control unit 19 includes a sleeve 22 disposed concentrically of the wall 14 of the housing 13, a core 23 disposed in and concentrically spaced from the sleeve to define a gap 24 therebetween and a pair of longitudinally spaced apart electromagnetic coils 26 for producing an electromagnetic field across the gap 23. A reservoir 25 for MR fluid is located between the injection piston 17 and the magnetic control unit 19 to deliver MR fluid into the gap 23 via openings 25' in the wall 21 of the housing 13.

An annular plate 27 is also secured between the means defining the first combustion chamber 11 and the housing 13 to close the annular combustion chamber 15. This plate 27 has at least one exhaust port 27 communicating with the annular combustion chamber 15 to exhaust combustion gases therefrom.

The means defining the first combustion chamber 11 includes a first tubular member 29 disposed concentrically within the annular injection piston 17 and a second tubular member 30 disposed concentrically of the injection piston 17 and coaxially of the first tubular member 29. As indicated the two tubular members 29, 30 are secured in threaded relation to each other.

The pump piston 16 has a pair of concentric annular grooves 31 each of of receives a sealing ring 32. Each sealing ring 32 slidably seals against an annular wall of the injection piston 17. The pump piston 16 is provided with a recess 33 which communicates with the liquid propellant chamber 18 via a threaded bore 34 that is sealed by a threaded plug 35. The threaded plug 35 is provided to allow for filling of the liquid propellant chamber 18 with liquid propellant after the pump piston 16 has been assembled with the injection piston 17.

The tubular members 29, 30 that define the first combustion chamber 11 are mounted from opposite sides of the housing 13 and are threaded into each other. In addition, the initiator 12 is mounted within the second tubular member 30 while the first tubular member 29 serves to secure the initiator in place. The first tubular member 29 also has a plurality of openings 36 which communicate the first combustion chamber 11 with the annular combustion chamber 15 to deliver hot combustion gases thereto.

The first tubular member 29 is mounted within the annular plate 27 while the second tubular member 30 is mounted in the housing 13.

An annular member 37 is disposed concentrically about the sleeve 22 of the magnetic control unit 19 to define an accumulator chamber 38 in communication with the gap 24 between the sleeve 22 and core 23 of the magnetic control unit 19 in order to receive MR fluid therefrom.

In order to assemble the inflator 50, the pump piston 16 is first slidably mounted into the injection piston 17. A liquid propellant is then introduced into the chamber 18 defined by the two pistons 16, 17. The threaded plug 35 is then threaded into place to close the liquid propellant chamber 18. The second tubular member 30 is then placed in the housing 13 and a prescribed amount of MR fluid is introduced into the housing 13. Then the injection piston and pump piston assembly is slidably mounted in the housing 13 and on the second tubular member 30.

Next, the initiator 12 is put into place and electrically connected to the central processing unit (not shown).

The annular plate 27 is then threaded into the wall 14 of the housing 13. Thereafter, the first tubular member 29 is passed through the annular plate 27 and threaded into the second tubular member 30 to close off the combustion chamber 11 and to secure the initiator 12 in place.

Thereafter, the magnetic control unit 19 consisting of the sleeve 22, core 23 and electromagnetic coils 26 is slid over the wall 14 of the housing 13. Then, the outer annular member 37 is slid over the magnetic control unit 19 and housing 13 to define the accumulator chamber 38.

The invention thus provides an air bag inflator of flat compact construction that is particularly suitable for fitting into a vehicle steering wheel.

What is claimed is:

1. An air bag inflator having
   a diameter larger than the thickness thereof;
   means defining a combustion chamber;
   an initiator for introducing a combustion gas into said combustion chamber;
   an injection piston slidably mounted in said combustion chamber for movement from an initial position towards a second position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto and means for releasably closing said nozzle to prevent communication between said propellant chamber and said combustion chamber; and
   a magnetic control unit concentric to said injection piston for controlling movement of said injection piston from said initial position towards said second position.

2. An inflator as set forth in claim 1 further comprising a pump piston mounted in said injection piston for sliding of said injection piston thereon to pressurize a liquid propellant in said propellant chamber in response to sliding of said injection piston towards said second position.

3. An inflator as set forth in claim 2 wherein said injection piston includes a cylindrical wall and a recessed face projecting into said propellant chamber and wherein said pump piston has a cylindrical wall and a recessed face receiving said recessed face of said injection piston therein.

4. An inflator as set forth in claim 1 wherein said injection piston is of annular shape.

5. An inflator as set forth in claim 4 further comprising an annular pump piston mounted in said annular injection piston for sliding of said injection piston thereon to pressurize a liquid propellant in said propellant chamber in response to sliding of said injection piston towards said second position.

6. An inflator as set forth in claim 1 wherein said magnetic control unit includes a sleeve disposed concentrically of said injection piston, a core disposed in and concentrically spaced from said sleeve to define a gap therebetween, a reservoir for magneto-rheological fluid between said injection piston and said gap and communicating with said gap to deliver the fluid thereto in response to said injection piston moving from said initial position towards said second position, and at least one electromagnetic coil for producing an electromagnetic field across said gap to affect the rheological properties of a magneto-rheological fluid in said gap whereby an increase in the electromagnetic field effects an increase in the flow resistance of the magneto-rheological fluid in said gap.

7. An inflator as set forth in claim 6 wherein said means includes a first annular well slideably receiving said injection piston therein and slideably receiving said core thereon, said annular wail having a plurality of openings therein communicating said reservoir with said gap to allow passage of the magneto-rheological fluid therethrough.

8. An inflator as set forth in claim 7 further comprising a pump piston mounted in said injection piston for sliding of said injection piston thereon to pressurize a liquid propellant in said propellant chamber in response to sliding of said injection piston towards said second position, said pump piston injection piston and wall defining said reservoir therebetween.

9. An inflator as set forth in claim 7 wherein said means further includes a contoured plate secured to said annular wall at one end thereof, said plate having at least one exhaust port for expelling combustion gasses therefrom.

10. An inflator as set forth in claim 9 further comprising a second annular wall disposed concentrically of and spaced from said first annular wall to define a diffusion chamber in communication with said exhaust port to receive combustion gasses therefrom, said second annular wall having at least one outlet for expelling combustion gasses therefrom.

11. An inflator as set forth in claim 10 wherein said second annular wall is concentric to and spaced from said sleeve of said magnetic control unit.

12. An air bag inflator comprising
    a cup shaped body having an annular wall defining a combustion chamber;
    a pump piston mounted in said body;
    an injection piston slidably mounted in said wail and slidably mounted on said pump piston to define a propellant chamber therewith, said injection piston having at least one nozzle communicating said propellant chamber with said combustion chamber to deliver liquid propellant thereto, and means for releasably closing said nozzle to prevent communication between said propellant chamber and said combustion chamber;
    a magnetic control unit for controlling movement of said injection piston relative to said pump piston, said magnetic control unit including a sleeve disposed concentrically of said wall, a core disposed in and concentrically spaced from said sleeve to define a gap therebetween, a reservoir for magneto-rheological fluid between said injection piston and said gap and communicating with said gap to deliver the fluid thereto in response to said injection piston moving from said initial position towards said second position, and at least one electromagnetic coil for producing an electromagnetic field across said gap to affect the rheological properties of a magneto-rheological fluid in said gap whereby an increase in the electromagnetic field effects an increase in the flow resistance of the magneto-rheological fluid in said gap;

a contoured plate secured to said annular wall of said cup shaped body at one end thereof, said plate having at least one exhaust port for expelling combustion gasses therefrom; and an initiator mounted in said plate for introducing a combustion gas into said combustion chamber.

13. An inflator as set forth in claim 12 further comprising a diffuser having an annular wall concentric to and spaced from said sleeve of said magnetic control unit to define a diffuser chamber therewith, said diffuser chamber being in communication with said exhaust port and said wall of said diffuser having at least one outlet for expelling combustion gasses therefrom.

14. An inflator as set forth in claim 13 wherein said contoured plate is spaced from said sleeve and said core to define a chamber in communication with said gap to receive magneto-rheological fluid therefrom.

15. An inflator as set forth in claim 12 wherein said wall of said diffuser is secured to said contoured plate at one end thereof.

16. An air bag inflator comprising
means defining a first combustion chamber;
an initiator for introducing a combustion gas into said first combustion chamber;
a housing having an annular wail defining an annular combustion chamber about and in communication with said first combustion chamber to receive hot combustion gases therefrom;
an annular pump piston mounted in said annular combustion chamber;
an annular injection piston slidably mounted on said pump piston to define an annular liquid propellant chamber therebetween, said injection piston being slidably mounted in said annular wall and slideably mounted on said means defining a first combustion chamber, said injection piston having at least one nozzle communicating said propellant chamber with said annular combustion chamber to deliver liquid propellant thereto, and means for releasably closing said nozzle to prevent communication between said propellant chamber and said annular combustion chamber;
a magnetic control unit for controlling movement of said injection piston relative to said pump piston, said magnetic control unit including a sleeve disposed concentrically of said wall of said housing, a core disposed in and concentrically spaced from said sleeve to define a gap therebetween, a reservoir for magneto-rheological fluid between said annular injection piston and said gap and communicating with said gap to deliver the fluid thereto in response to said injection piston moving over said pump piston, and at least one electromagnetic coil for producing an electromagnetic field across said gap to affect the rheological properties of a magneto-rheological fluid in said gap whereby an increase in the electromagnetic field effects an increase in the flow resistance of the magneto-rheological fluid in said gap; and
an annular plate secured between said means and said housing to close said annular combustion chamber, said plate having at least one exhaust port therein communicating with said annular combustion chamber to exhaust combustion gases therefrom.

17. An air bag inflator as set forth in claim 16 further comprising an annular member disposed concentrically about said sleeve and said core to define an accumulator chamber in communication with said gap to receive magneto-rheological fluid therefrom.

18. An air bag inflator as set forth in claim 16 wherein said means defining said first chamber includes a first tubular member disposed concentrically within said annular injection piston and a second tubular member disposed concentrically of said injection piston and coaxially of said first tubular member, said first and said second tubular members being secured in threaded relation to each other.

19. An air bag inflator as set forth in claim 18 wherein said initiator is mounted in said second tubular member and said first combustion chamber is disposed in said first tubular member.

20. An air bag inflator as set forth in claim 16 having a larger diameter than thickness thereof.

21. An air bag inflator having
a diameter larger than the thickness thereof;
means defining a combustion chamber;
an initiator for introducing a combustion gas into said combustion chamber;
an injection piston slidably mounted in said combustion chamber for movement from an initial position towards a second position in response to the introduction of a combustion gas into said combustion chamber from said initiator; and
a magnetic control unit concentrically disposed about said injection piston for controlling movement of said injection piston from said initial position towards said second position.

22. An inflator as set forth in claim 21 wherein said magnetic control unit includes a sleeve disposed concentrically of said injection piston, a core disposed in and concentrically spaced from said sleeve to define a gap therebetween, a reservoir for magneto-rheological fluid between said injection piston and said gap and communicating with said gap to deliver the fluid thereto in response to said injection piston moving from said initial position towards said second position, and at least one electromagnetic coil for producing an electromagnetic field across said gap to affect the rheological properties of a magneto-rheological fluid in said gap whereby an increase in the electromagnetic field effects an increase in the flow resistance of the magneto-rheological fluid in said gap.

23. An air bag inflator comprising
means defining a combustion chamber;
an initiator far introducing a combustion gas into said combustion chamber;
an injection piston slidably mounted in said combustion chamber for movement from an initial position towards a second position in response to the introduction of a combustion gas into said combustion chamber from said initiator, said piston including a propellant chamber therein for containing a charge of liquid propellant therein at least one nozzle communicating said propellant chamber with said combustion chamber to deliver liquid propellant thereto, and means for releasably closing said nozzle to prevent communication between said propellant chamber and said combustion chamber;
a pump piston fixedly mounted in said injection piston for sliding of said injection piston thereon to pressurize a liquid propellant in said propellant chamber in response to sliding of said injection piston towards said second position; and a magnetic control unit concentric to said injection piston for controlling movement of said injection piston from said initial position towards said second position.

* * * * *